United States Patent
Kanda et al.

(10) Patent No.: US 10,447,163 B2
(45) Date of Patent: Oct. 15, 2019

(54) DC/DC CONVERTER

(71) Applicant: Yazaki Corporation, Tokyo (JP)

(72) Inventors: Keisuke Kanda, Shizuoka (JP);
Michito Enomoto, Shizuoka (JP);
Shingo Suzuki, Shizuoka (JP)

(73) Assignee: YAZAKI CORPORATION,
Minato-ku, Tokyo (JP)

( * ) Notice: Subject to any disclaimer, the term of this patent is extended or adjusted under 35 U.S.C. 154(b) by 0 days.

(21) Appl. No.: 16/287,344

(22) Filed: Feb. 27, 2019

(65) Prior Publication Data

US 2019/0199218 A1 Jun. 27, 2019

Related U.S. Application Data

(63) Continuation of application No. PCT/JP2017/022127, filed on Jun. 15, 2017.

(30) Foreign Application Priority Data

Oct. 4, 2016 (JP) .................. 2016-196752

(51) Int. Cl.
*H02M 3/07* (2006.01)
*H02M 3/155* (2006.01)
(Continued)

(52) U.S. Cl.
CPC ........... *H02M 3/1582* (2013.01); *H02M 3/07* (2013.01); *H02M 1/08* (2013.01); *H02M 3/155* (2013.01); *H02M 2001/0006* (2013.01)

(58) Field of Classification Search
CPC .... H02M 3/07–2003/078; H02M 3/155–1588; H02M 2001/0006;
(Continued)

(56) References Cited

U.S. PATENT DOCUMENTS

| 6,894,463 | B2* | 5/2005 | Kernahan | G05F 3/262 |
| | | | | 323/267 |
| 2011/0156483 | A1* | 6/2011 | Caraghiorghiopol | G06F 1/263 |
| | | | | 307/66 |

(Continued)

FOREIGN PATENT DOCUMENTS

| JP | 2006-033972 A | 2/2006 |
| JP | 2013-085383 A | 5/2013 |

(Continued)

OTHER PUBLICATIONS

Notification of Reasons for Refusal of Japanese Appplcation No. 2016-196752 dated Jul. 31, 2018.
(Continued)

*Primary Examiner* — Gustavo A Rosario-Benitez
*Assistant Examiner* — Peter M Novak
(74) *Attorney, Agent, or Firm* — Sughrue Mion, PLLC

(57) ABSTRACT

In a DC/DC converter, when stepping up voltage from an input unit to an output unit or when stepping down voltage from the output unit to the input unit, a second driver IC outputs to a charge pump circuit a control signal for controlling a switching element so as to alternately repeat ON/OFF when a switching element is ON and a switching element is OFF. When stepping up voltage from the output unit to the input unit or when stepping down voltage from the input unit to the output unit, a first driver IC outputs to the charge pump circuit a control signal for controlling the switching element so as to alternately repeat ON/OFF when a switching element is ON and the switching element is OFF. As a result, the DC/DC converter can drive the charge pump circuit without providing an oscillation circuit.

2 Claims, 2 Drawing Sheets

(51) Int. Cl.
*H02M 3/158* (2006.01)
*H02M 1/08* (2006.01)
*H02M 1/00* (2006.01)

(58) Field of Classification Search
CPC .. H02M 1/08; H02M 3/158; H02J 3/32; H02J 7/0068; H02J 7/345; B60L 2210/10–14
See application file for complete search history.

(56) References Cited

U.S. PATENT DOCUMENTS

| | | | | |
|---|---|---|---|---|
| 2013/0021015 | A1* | 1/2013 | Moussaoui | H02M 3/1582 323/311 |
| 2013/0301323 | A1 | 11/2013 | Iyasu et al. | |
| 2014/0252950 | A1 | 9/2014 | Kikuchi et al. | |
| 2016/0294285 | A1* | 10/2016 | Le Men | H02M 3/1582 |
| 2018/0109179 | A1* | 4/2018 | Zhao | H02M 3/07 |
| 2019/0086462 | A1* | 3/2019 | Sugisawa | G01R 31/006 |
| 2019/0165591 | A1* | 5/2019 | Kisacikoglu | H02J 7/0054 |
| 2019/0168634 | A1* | 6/2019 | Teng | B60L 58/18 |
| 2019/0222047 | A1* | 7/2019 | Chen | H02J 7/0052 |

FOREIGN PATENT DOCUMENTS

| | | |
|---|---|---|
| JP | 2013-255413 A | 12/2013 |
| JP | 2014-175124 A | 9/2014 |
| JP | 2015-162951 A | 9/2015 |

OTHER PUBLICATIONS

Notification of Reasons for Refusal of Japanese Appplcation No. 2016-196752 dated Oct. 2, 2018.
International Search Report of PCT/JP2017/022127 dated Jul. 11, 2017 [PCT/ISA/210].

* cited by examiner

DC/DC CONVERTER

CROSS-REFERENCE TO RELATED APPLICATION

This application is a continuation application of International Application PCT/JP2017/022127, filed on Jun. 15, 2017, and designating the U.S., the entire contents of which are incorporated herein by reference.

BACKGROUND OF THE INVENTION

1. Field of the Invention

The present invention relates to a DC/DC converter.

2. Description of the Related Art

There is a DC/DC converter capable of bidirectional step-up/step-down voltage conversion. Such a DC/DC converter needs to keep either one of two switching elements disposed on a Hi side ON when stepping up or down voltage, and thus includes those with a charge pump circuit that supplies power to a driver IC that controls ON/OFF of the switching elements and an oscillation circuit for driving the charge pump circuit (for example, see Japanese Patent Application Laid-open No. 2014-175124).

In the conventional DC/DC converter described above, since an oscillation circuit is provided to drive a charge pump circuit, there is room for improvement from a viewpoint of reducing the number of parts.

SUMMARY OF THE INVENTION

An object of the present invention is to provide a DC/DC converter capable of driving a charge pump circuit without providing an oscillation circuit.

In order to achieve the above mentioned object, a DC/DC converter according to one aspect of the present invention includes a choke coil; a first input/output unit and a second input/output unit, either one of which serves as an input unit and the other of which serves an output unit; a first switching element that connects the first input/output unit and one end of the choke coil during ON-state and disconnects the connection between the first input/output unit and one end of the choke coil during OFF-state; a second switching element that is disposed between a first connection point between one end of the choke coil and the first switching element and GND, connects the first connection point and the GND during ON-state, and disconnects the connection between the first connection point and the GND during OFF-state; a third switching element that connects the second input/output unit and the other end of the choke coil during ON-state and disconnects the connection between the second input/output unit and the other end of the choke coil during OFF-state; a fourth switching element that is disposed between a second connection point between the other end of the choke coil and the third switching element and the GND, connects the second connection point and the GND during ON-state, and disconnects the connection between the second connection point and the GND during OFF-state; a first controller that controls ON/OFF of the first switching element and the second switching element; a second controller that controls ON/OFF of the third switching element and the fourth switching element; and a charge pump circuit that supplies power to the first controller and the second controller, wherein when stepping up DC voltage input to the first input/output unit to be output to the second input/output unit or when stepping down DC voltage input to the second input/output unit to be output to the first input/output unit, the second controller outputs to the charge pump circuit a control signal for controlling the fourth switching element so as to alternately repeat ON-state or OFF-state when the first switching element is ON-state and the second switching element is OFF-state, and when stepping up DC voltage input to the second input/output unit to be output to the first input/output unit or when stepping down DC voltage input to the first input/output unit to be output to the second input/output unit, the first controller outputs to the charge pump circuit a control signal for controlling the second switching element so as to alternately repeat ON-state or OFF-state when the third switching element is ON-state and the fourth switching element is OFF-state.

According to another aspect of the present invention, in the DC/DC converter, it is preferable that the charge pump circuit includes: a first capacitor that is connected in parallel with the first controller and supplies power to the first controller; a second capacitor that charges the first capacitor; a third capacitor that is connected in parallel with the second controller and supplies power to the second controller; and a fourth capacitor that charges the third capacitor, and the charge pump circuit charges the second capacitor or the fourth capacitor by an input control signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a DC/DC converter according to the present invention will be described in detail with reference to the drawings. The present invention is not limited to the embodiments described below. In addition, constituent elements in the embodiments described below include those that are what is called replaceable by those skilled in the art and easy, or those substantially identical. Further, various types of omissions, substitutions, or changes can be made to the constituent elements in the embodiments described below without departing from the gist of the invention.

Embodiments

Figure 1:
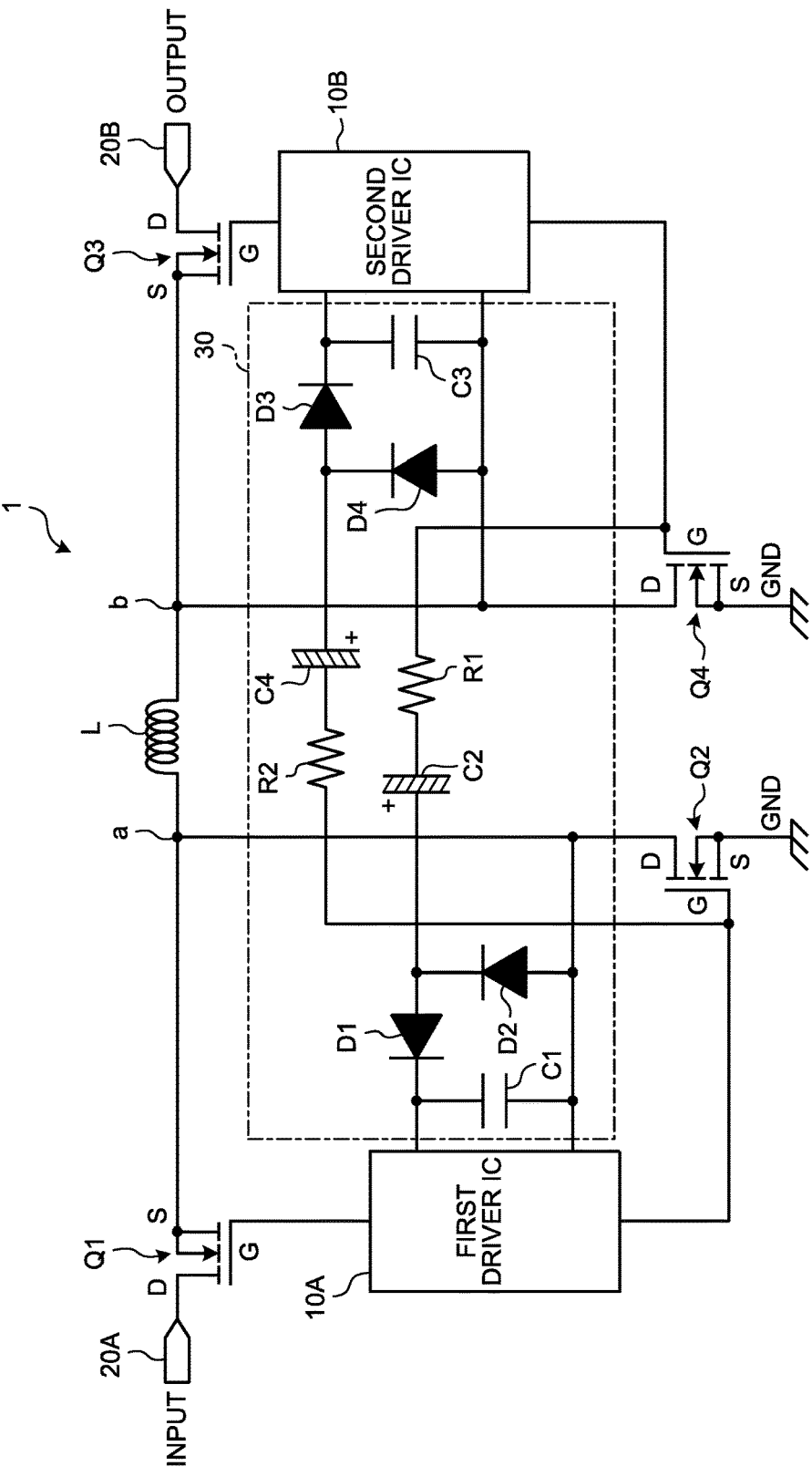
FIG. 1 is a schematic configuration diagram of a DC/DC converter according to an embodiment of the present invention.
Figure 2:
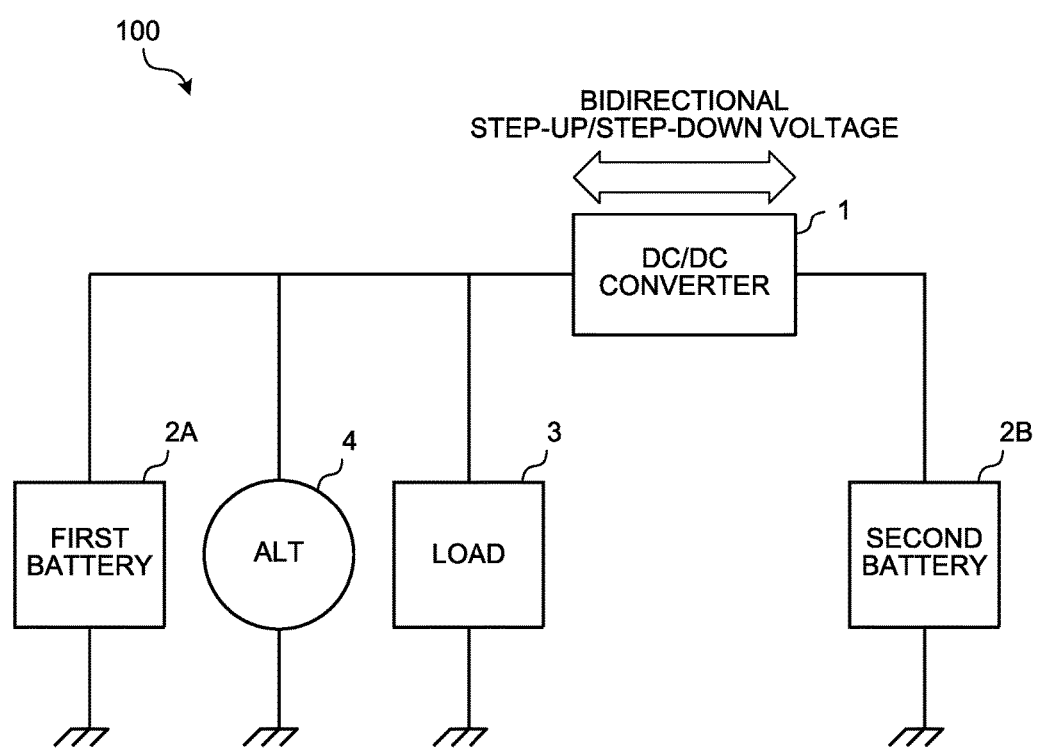
FIG. 2 is a schematic configuration diagram of a power supply system including a DC/DC converter according to an embodiment of the present invention.

With reference to FIGS. 1 and 2, a DC/DC converter according to an embodiment will be described below. FIG. 1 is a schematic configuration diagram of the DC/DC converter according to the embodiment. FIG. 2 is a schematic configuration diagram of a power supply system including the DC/DC converter according to the embodiment.

As illustrated in FIGS. 1 and 2, a DC/DC converter 1 according to the present embodiment is applied to a power supply system 100 that is mounted on a vehicle such as an electric vehicle (EV), a hybrid vehicle (HEV), and a plug-in hybrid vehicle (PHEV) and is a direct current voltage converter capable of bidirectionally stepping up or stepping down DC voltage.

First, with reference to FIG. 2, the power supply system 100 to which the DC/DC converter 1 is applied will be described.

The power supply system 100 includes the DC/DC converter 1, a first battery 2A, a second battery 2B, a load 3, and an alternator (ALT) 4. The first battery 2A is a power source of a vehicle and is formed of a secondary battery such as a lead storage battery. The first battery 2A stores power supplied from the alternator 4 or power supplied from the second battery 2B and subjected to voltage conversion by the DC/DC converter 1 and supplies the stored power to the load 3. The second battery 2B is another power source of a vehicle. The second battery 2B has a rated voltage different from one of the first battery 2A and is formed of a secondary battery such as a lithium ion battery. The second battery 2B stores power supplied from the alternator 4 and subjected to voltage conversion by the DC/DC converter 1 and subjects the stored power to voltage conversion by the DC/DC converter 1 to be supplied to the first battery 2A. The load 3 is, for example, an electrical component mounted on a vehicle and includes an electronic control unit (ECU), an air conditioner, a car navigation system, and the like. The load 3 is operated by power supplied from the first battery 2A. The alternator 4 is a so-called generator and supplies generated power to the first battery 2A or subjects generated power to voltage conversion by the DC/DC converter 1 to be supplied to the second battery 2B.

The DC/DC converter 1 according to the present embodiment has, for example, a circuit configuration by an H bridge type chopper system. In other words, the DC/DC converter 1 includes an input unit 20A and an output unit 20B, a choke coil L, four switching elements Q1, Q2, Q3, and Q4, a first driver IC 10A, a second driver IC 10B, four capacitors C1, C2, C3, and C4, four diodes D1, D2, D3, and D4, and two resistors R1 and R2.

The input unit 20A and the output unit 20B each serve as an input/output unit because the DC/DC converter 1 is capable of bidirectionally stepping up or stepping down DC voltage. This means that when either one of the input unit 20A and the output unit 20B serves an input unit, the other serves an output unit. The input unit 20A is a first input/output unit and inputs DC voltage to be stepped down or stepped up. The output unit 20B is a second input/output unit and outputs DC voltage stepped up or stepped down by the DC/DC converter 1. In the present embodiment, as illustrated in FIG. 1, with the choke coil L as center, one connected to the switching element Q1 is the input unit 20A, and the other connected to the switching element Q3 side is the output unit 20B.

The choke coil L is a so-called inductor (or reactor). One end of the choke coil L is connected to the input unit 20A via the switching element Q1, and the other end is connected to the output unit 20B via the switching element Q3.

The four switching elements Q1, Q2, Q3, and Q4 are formed by field-effect transistors such as an n-channel MOS-FET.

A drain (D) side of the switching element Q1 is connected to the input unit 20A, a source (S) side is connected to one end of the choke coil L, and a gate (G) side is connected to an output of the first driver IC 10A. The switching element Q1 connects the input unit 20A and the choke coil L during ON-state and disconnects the connection between the input unit 20A and the choke coil L during OFF-state.

The switching element Q2 is disposed between a first connection point a between the switching element Q1 and the choke coil L and GND. More specifically, the switching element Q2 is connected in parallel with the choke coil L to the input unit 20A. A drain side of the switching element Q2 is connected to the first connection point a, a source side is connected to GND, and a gate side is connected to the output of the first driver IC 10A. The switching element Q2 connects the first connection point a and the GND during ON-state and disconnects the connection between the first connection point a and the GND during OFF-state.

A drain side of the switching element Q3 is connected to the output unit 20B, a source side is connected to the other end of the choke coil L, and a gate side is connected to an output of the second driver IC 10B. The switching element Q3 connects the output unit 20B and the choke coil L during ON-state and disconnects the connection between the output unit 20B and the choke coil L during OFF-state.

The switching element Q4 is disposed between a second connection point b between the choke coil L and the switching element Q3 and GND. In other words, the switching element Q4 is connected in parallel with the switching element Q3 to the choke coil L. A drain side of the switching element Q4 is connected to the second connection point b, a source side is connected to the GND, and a gate side is connected to the output of the second driver IC 10B. The switching element Q4 connects the second connection point b and the GND during ON-state and disconnects the connection between the second connection point b and the GND during OFF-state.

The first driver IC 10A and the second driver IC 10B are gate driver ICs that drive a plurality of switching elements on a Hi and a Lo sides. Here, on the Hi side, switching elements Q1 and Q3 are included, and on the Lo side, switching elements Q2 and Q4 are included. The first driver IC 10A is a first controller and transmits any one of a Hi signal, a Lo signal, or a pulse width modulation (PWM) signal to the switching elements Q1 and Q2 to control ON/OFF of the switching elements Q1 and Q2. The second driver IC 10B is a second controller and transmits any one of a Hi signal, a Lo signal, or a PWM signal to the switching elements Q3 and Q4 to control ON/OFF of the switching elements Q3 and Q4. The first driver IC 10A and the second driver IC 10B may be configured to amplify and output a PWM signal input from a PWM signal generator (not illustrated).

The four capacitors C1 to C4 together with the four diodes D1 to D4 and the two resistors R1 and R2 form a so-called charge pump circuit 30. The charge pump circuit 30 here supplies power for operating the first driver IC 10A and the second driver IC 10B.

The capacitor C1 is a so-called bootstrap capacitor that is connected in parallel with the first driver IC 10A and supplies power to the first driver IC 10A.

The capacitor C2 is an electrolytic capacitor for charging the capacitor C1. An anode (+) side of the capacitor C2 is connected to the capacitor C1 via the diode D1 disposed in a forward direction, and a cathode (−) side is connected to the gate side of the switching element Q4 via the resistor R1.

The capacitor C3 is a so-called bootstrap capacitor that is connected in parallel with the second driver IC 10B and supplies power to the second driver IC 10B.

The capacitor C4 is an electrolytic capacitor for charging the capacitor C3. An anode (+) side of the capacitor C4 is connected to the capacitor C3 via the diode D3 disposed in a forward direction, and a cathode (−) side is connected to the gate side of the switching element Q2 via the resistor R2.

The diodes D1 and D2 work so that current flows in a forward direction from the capacitor C2 to the capacitor C1, and the diodes D3 and D4 work so that current flows in a forward direction from the capacitor C4 to the capacitor C3. The resistors R1 and R2 are resistors for preventing noise.

Next, an operation example when stepping up and down voltage in the DC/DC converter 1 will be described.

When stepping up from the input unit 20A toward the output unit 20B or stepping down from the output unit 20B toward the input unit 20A, the DC/DC converter 1 configured as described above operates as follows. First, the first driver IC 10A transmits a Hi signal to the Hi-side switching element Q1 to be switched to ON-state and transmits a Lo signal to the Lo-side switching element Q2 to be switched to OFF-state. Then, the second driver IC 10B transmits a first control signal for controlling the switching element Q4 so as to alternately repeat ON-state or OFF-state to the switching element Q4 and transmits a second control signal for controlling the switching element Q3 so as to alternately repeat OFF-state or ON-state to the switching element Q3. Here, the first control signal is a PWM signal having a constant frequency, and the second control signal is a PWM signal having a phase opposite to one of the first control signal. The charge pump circuit 30 receives the first control signal (PWM signal) output from the second driver IC 10B toward the gate of the switching element Q4 and is driven by the PWM signal. By the input PWM signal, the charge pump circuit 30 repeats charging the capacitor C2 and charging the capacitor C1 from the charged capacitor C2. In this way, when the switching element Q1 is ON-state and the switching element Q2 is OFF-state, the PWM signal for controlling the switching element Q4 is input to the charge pump circuit 30 to be driven, thereby charging the capacitor C1 and continuing power supply from the capacitor C1 to the first driver IC 10A. Thus, the charge pump circuit 30 can be driven without providing an oscillation circuit, and the DC/DC converter 1 can be operated normally with the switching element Q1 always kept ON-state.

Further, when stepping up from the output unit 20B toward the input unit 20A or stepping down from the input unit 20A toward the output unit 20B, the DC/DC converter 1 configured as described above operates as follows. First, the second driver IC 10B transmits a Hi signal to the Hi-side switching element Q3 to be switched to ON-state and transmits a Lo signal to the Lo-side switching element Q4 to be switched to OFF-state. Then, the first driver IC 10A transmits a third control signal for controlling the switching element Q2 so as to alternately repeat ON-state or OFF-state to the switching element Q2 and transmits a fourth control signal for controlling the switching element Q1 so as to alternately repeat ON-state or OFF-state to the switching element Q1. Here, the third control signal is a PWM signal having a constant frequency, and the fourth control signal is a PWM signal having a phase opposite to one of the third control signal. The charge pump circuit 30 receives the third control signal (PWM signal) output from the first driver IC 10A toward the gate of the switching element Q2 and is driven by the PWM signal. By the input PWM signal, the charge pump circuit 30 repeats charging the capacitor C4 and charging the capacitor C3 from the charged capacitor C4. In this way, when the switching element Q3 is ON-state and the switching element Q4 is OFF-state, the PWM signal for controlling the switching element Q2 is input to the charge pump circuit 30 to be driven, thereby charging the capacitor C3 and continuing power supply from the capacitor C3 to the second driver IC 10B. Thus, the charge pump circuit 30 can be driven without providing an oscillation circuit, and the DC/DC converter 1 can be operated normally with switching element Q3 always kept ON-state.

Further, in the DC/DC converter 1 configured as described above, the capacitor C2 and the gate side of the switching element Q4 are connected with the resistor R1, and the capacitor C4 and the gate side of the switching element Q2 are connected with the resistor R2. This makes it possible to prevent malfunction of the switching elements Q2 and Q4, caused by influence of noise passing through the capacitor C2 or C4.

According to the DC/DC converter 1 described above, the choke coil L, the input unit 20A and the output unit 20B, the four switching elements Q1 to Q4, the first driver IC 10A and the second driver IC 10B, and the charge pump circuit 30 are included. When stepping up DC voltage input to the input unit 20A to be output to the output unit 20B or when stepping down DC voltage input to the output unit 20B to be output to the input unit 20A, the second driver IC 10B outputs to the charge pump circuit 30 a control signal for controlling the switching element Q4 so as to alternately repeat ON-state or OFF-state when the switching element Q1 is ON-state and the switching element Q2 is OFF-state. On the other hand, when stepping up DC voltage input to the output unit 20B to be output to the input unit 20A or when stepping down DC voltage input to the input unit 20A to be output to the output unit 20B, the first driver IC 10A outputs to the charge pump circuit 30 a control signal for controlling the switching element Q2 so as to alternately repeat ON-state or OFF-state when the switching element Q3 is ON-state and the switching element Q4 is OFF-state. With the above configuration, the charge pump circuit 30 can be driven without providing an oscillation circuit, and the DC/DC converter 1 can be operated normally. With the above configuration, it is possible to eliminate a problem, for example, when the DC/DC converter 1 steps up DC voltage from the input unit 20A toward the output unit 20B, of unstable operation of the first driver IC 10A due to insufficient charging of the capacitor C1 resulting in an inability to keep the switching element Q1 ON-state and abnormal operation of the DC/DC converter 1. In addition, when the charge pump circuit 30 is driven by an oscillation circuit, the oscillation circuit serves as a noise source. Therefore, the charge pump circuit 30 can be driven without providing an oscillation circuit, which makes it possible to reduce noise and also reduce parts for reducing the noise. Further, since the charge pump circuit 30 can be driven without providing an oscillation circuit, the number of parts constituting the DC/DC converter 1 can be reduced, and an area required for mounting the parts constituting the DC/DC converter 1 can be reduced.

Moreover, according to the DC/DC converter 1 described above, the charge pump circuit 30 includes the capacitor C1 that is connected in parallel with the first driver IC 10A and supplies power to the first driver IC 10A, the capacitor C2 that charges the capacitor C1, the capacitor C3 that is connected in parallel with the second driver IC 10B and supplies power to the second driver IC 10B, and the capacitor C4 that charges the capacitor C3, and the charge pump circuit 30 charges the capacitor C2 or C4 by an input PWM signal. As a result, charging from the capacitor C2 to the capacitor C1 or charging from the capacitor C4 to the capacitor C3 is performed by an input PWM signal, so that the charge pump circuit 30 can be driven without providing an oscillation circuit.

Modifications

In the above description, the case has been described where the DC/DC converter 1 is a DC voltage converter capable of bidirectionally stepping up or stepping down voltage. However, the DC/DC converter 1 may be capable of stepping up or stepping down voltage in only one direction.

In the DC/DC converter according to the present embodiment, a controller outputs a control signal for controlling a switching element so as to alternately repeat ON-state or OFF-state to a charge pump circuit. This makes it possible to drive a charge pump circuit without providing an oscillation circuit.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A DC/DC converter comprising:
a choke coil;
a first input/output unit and a second input/output unit, either one of which serves as an input unit and the other of which serves an output unit;
a first switching element that connects the first input/output unit and one end of the choke coil during ON-state and disconnects the connection between the first input/output unit and one end of the choke coil during OFF-state;
a second switching element that is disposed between a first connection point between one end of the choke coil and the first switching element and GND, connects the first connection point and the GND during ON-state, and disconnects the connection between the first connection point and the GND during OFF-state;
a third switching element that connects the second input/output unit and the other end of the choke coil during ON-state and disconnects the connection between the second input/output unit and the other end of the choke coil during OFF-state;
a fourth switching element that is disposed between a second connection point between the other end of the choke coil and the third switching element and the GND, connects the second connection point and the GND during ON-state, and disconnects the connection between the second connection point and the GND during OFF-state;
a first controller that controls ON/OFF of the first switching element and the second switching element;
a second controller that controls ON/OFF of the third switching element and the fourth switching element; and
a charge pump circuit that supplies power to the first controller and the second controller, wherein
when stepping up DC voltage input to the first input/output unit to be output to the second input/output unit or when stepping down DC voltage input to the second input/output unit to be output to the first input/output unit,
the second controller outputs to the charge pump circuit a control signal for controlling the fourth switching element so as to alternately repeat ON-state or OFF-state when the first switching element is ON-state and the second switching element is OFF-state, and
when stepping up DC voltage input to the second input/output unit to be output to the first input/output unit or when stepping down DC voltage input to the first input/output unit to be output to the second input/output unit,
the first controller outputs to the charge pump circuit a control signal for controlling the second switching element so as to alternately repeat ON-state or OFF-state when the third switching element is ON-state and the fourth switching element is OFF-state.

2. The DC/DC converter according to claim 1, wherein the charge pump circuit includes:
a first capacitor that is connected in parallel with the first controller and supplies power to the first controller;
a second capacitor that charges the first capacitor;
a third capacitor that is connected in parallel with the second controller and supplies power to the second controller; and
a fourth capacitor that charges the third capacitor, and
the charge pump circuit charges the second capacitor or the fourth capacitor by an input control signal.

* * * * *